(12) United States Patent
Oosterhof et al.

(10) Patent No.: US 6,514,475 B1
(45) Date of Patent: Feb. 4, 2003

(54) PROCESS FOR THE PRODUCTION OF SODIUM CARBONATE ANHYDRATE

(75) Inventors: Harald Oosterhof, Delft (NL); Gerda Maria van Rosmalen, Delft (NL); Geert-Jan Witkamp, Bergschenhoek (NL); Johannes de Graauw, Zoetermeer (NL)

(73) Assignee: Technische Universiteit Delft, Delft (NL)

( * ) Notice: Subject to any disclaimer, the term of this patent is extended or adjusted under 35 U.S.C. 154(b) by 0 days.

(21) Appl. No.: 09/203,270

(22) Filed: Dec. 1, 1998

(30) Foreign Application Priority Data

Nov. 24, 1998 (EP) .............................................. 98203963

(51) Int. Cl.$^7$ ................................................. C01D 7/00
(52) U.S. Cl. ..................... 423/421; 423/427; 423/206.2; 23/300; 23/302 T
(58) Field of Search ................................ 423/421, 426, 423/429, 427, 206.2; 23/293 R, 300, 302 T

(56) References Cited

U.S. PATENT DOCUMENTS

| | | | | |
|---|---|---|---|---|
| 2,670,269 A | * | 2/1954 | Rahn | 23/302 T |
| 3,425,795 A | * | 2/1969 | Howard | 23/300 |
| 3,725,014 A | * | 4/1973 | Poncha | 23/302 T |
| 3,796,794 A | * | 3/1974 | Ilardi et al. | 423/421 |
| 3,975,499 A | * | 8/1976 | Walden | 423/421 |
| 4,104,033 A | * | 8/1978 | Mahn | 23/300 |
| 4,183,901 A | * | 1/1980 | Ilardi et al. | 423/421 |
| 4,374,102 A | * | 2/1983 | Connelly et al. | 423/421 |
| 4,879,042 A | * | 11/1989 | Hanson et al. | 210/642 |
| 5,716,419 A | * | 2/1998 | Larsen | 23/302 T |
| 6,022,385 A | * | 2/2000 | Bowman | 423/422 |

FOREIGN PATENT DOCUMENTS

| | | | | |
|---|---|---|---|---|
| EP | 0191152 | * | 8/1986 | 423/426 |
| GB | 748443 | * | 5/1956 | 423/426 |
| GB | 2109783 | * | 6/1983 | |

* cited by examiner

*Primary Examiner*—Steven Bos
(74) *Attorney, Agent, or Firm*—Fitch, Even, Tabin & Flannery

(57) ABSTRACT

The invention is directed to a process for the production of sodium carbonate-anhydrate having a bulk density of at least 800 kg/m$^3$, said process comprising:

providing a suspension of solid sodium carbonate and/or solid sodium bicarbonate and/or solid double salts at least comprising one of sodium carbonate and sodium bicarbonate, in a mixture containing water and an organic, water miscible or partly water miscible solvent, which solvent influences the transition temperature below which sodium carbonate monohydrate is stable, whereby the type and the amount of solvent is selected in such way that the said transition temperature is below the boiling point of the said mixture of water and an organic, water miscible or partly water miscible solvent, in case sodium bicarbonate is present, converting the bicarbonate into carbonate, crystallising sodium carbonate anhydrate from said mixture at a temperature above the said transition temperature and below the said boiling point, and recovering the sodium carbonate anhydrate.

12 Claims, No Drawings

PROCESS FOR THE PRODUCTION OF SODIUM CARBONATE ANHYDRATE

BACKGROUND OF THE INVENTION

The invention is directed to a process for the production of anhydrous soda, sodium carbonate anhydrate, with a bulk density of at least 800, preferably at least 1000, more in particular at least 1300 kg/m$^3$, by crystallisation.

Soda is an important chemical, which is produced in large amounts. It is used, among others, in production of glass. There are generally two processes for this production, the so-called Solvay process and the trona process.

The former is based on the production of solid sodium bicarbonate, which is calcined into light soda anhydrate (crystal water free soda). This calcination is the chemical conversion of bicarbonate to carbonate, carbon dioxide and water.

The latter process is based on the mining of trona, mainly consisting of the double salt of sodium carbonate and sodium bicarbonate, with two water molecules, and varying amounts of contaminants. Trona is converted to soda, dissolved and purified. Subsequently soda is crystallised from the clear solution as the monohydrate, followed by drying to give light soda anhydrate. A review of the various aspects of the refining of trona is given in the paper by Aitala et al, Process for Selection Criteria for refining Trona to Commercial Products, presented at the First International Soda Ash Conference (ISAC), Jun. 11, 1997.

Light soda ash produced by either the trona-route or the Solvay process has a low bulk density. This results in high transport costs and gives rise to dusting during transportation and handling. Depending on the process used, this light soda ash has a bulk density of 550 (Solvay) or 800 (Trona) kg/m$^3$.

A heat densification process can be used to increase the density of the product to about 1000 kg/m$^3$. During this process hot water is added to the light product to produce monohydrate, which is immediately evaporated in a calciner to form anhydrate again. This requires a large amount of energy.

Sodium carbonate can be crystallised as various hydrates. In aqueous solutions, the anhydrous form ($Na_2CO_3$) is only stable at temperatures above 109° C., which is higher than the boiling point at atmospheric pressure of a saturated soda ash solution (105° C.). This means that evaporative crystallisation can only produce anhydrous soda at elevated pressures i.e. when the boiling temperature is higher than the transition temperature (the transition temperature is hardly influenced by pressure).

Because evaporative crystallisation in pressurised vessels is expensive, in the trona process the soda is often crystallised by evaporation of water at lower temperatures: $Na_2CO_3 \cdot 1H_2O$ or monohydrate is produced. After a drying step at 150 to 200° C., whereby the crystal water is removed, the end-product is porous and usually has a bulk density of 800 kg/m$^3$.

The conventional evaporative crystallisation, drying and heat densification steps require a high energy input. The resulting product, after heat densification is a dense soda, having a density of about 1000 kg/m$^3$.

From earlier work it is known to produce crystal water free soda, i.e. sodium carbonate anhydrate, by direct evaporative crystallisation at atmospheric pressure from an aqueous solution. The driving force for the crystallisation in this process is the evaporation of water. In this process the boiling point of the saturated sodium carbonate solution is increased to a temperature above the transition temperature above which sodium carbonate monohydrate is unstable, by adding an amount of an organic solvent. Upon evaporative crystallisation sodium carbonate anhydrate can be recovered directly from the crystallising mixture, in a dense form. This sodium carbonate anhydrate has a bulk density of far above 1000 kg/m$^3$, generally in the range of 1300 to 1600 kg/m$^3$.

This system is limited to crystallisation by evaporation of the solvent, i.e. the water, which means that the economical application of the process is limited to those systems wherein all sodium carbonate is fully dissolved.

In view of the high energy requirements of the is conventional process (evaporating water in the monohydrate evaporative crystallization; removing the crystal water to produce anhydrate; heat densification treatment), it would be an important improvement if one or more of these steps could be deleted, without decrease of the bulk density of anhydrous soda.

Another, very profitable improvement would be if there could be provided a process for converting light soda ash to soda ash having a higher bulk density, without evaporation of water being necessary, i.e. a process to replace the heat densification process. Finally, it would also be very important to provide a process wherein soda ash of high bulk density is produced more or less directly from bicarbonate containing feedstocks, such as trona, or pure bicarbonate.

SUMMARY OF THE INVENTION

The present invention is based on the principle that when recrystallising soda from a dispersion thereof in an aqueous medium, it is possible to produce soda, free of crystal water, of high to very high bulk density, provided that the 'water-activity' of the systems is modified in such a way that the temperature of the crystallising system is below the boiling point of the system and above the transition temperature of the monohydrate-anhydrate transition. The crystallisation of soda anhydrate occurs here via a solution mediated conversion of one solid phase into another solid phase.

The invention in its broadest form is accordingly directed to a process for the production of sodium carbonate-anhydrate having a bulk density of at least 800 kg/m$^3$, said process comprising:

providing a suspension of solid sodium carbonate and/or solid sodium bicarbonate and/or solid double salts at least comprising one of sodium carbonate and sodium bicarbonate, in a mixture containing water and an organic, water miscible or partly water miscible solvent, which solvent influences the transition temperature below which sodium carbonate monohydrate is stable, whereby the type and the amount of solvent is selected in such way that the said transition temperature is below the boiling point of the said mixture of water and an organic, water miscible or partly water miscible solvent, in case sodium bicarbonate is present, converting the bicarbonate into carbonate, crystallising sodium carbonate anhydrate from said mixture at a temperature above the said transition temperature and below the said boiling point, and recovering the sodium carbonate anhydrate.

The term 'solvent' as used herein indicates an organic water miscible or partly water miscible organic liquid, which influences the water activity, which will generally result in a decrease of the transition temperature of the anhydrate-monohydrate transition. This transition temperature is defined as the temperature in the phase diagram of sodium carbonate, above which the anhydrate crystal form of sodium carbonate is stable. The term 'solvent' includes, unless otherwise indicated also combinations of two or more solvents.

The starting materials for the process of the present invention are the various forms in which sodium carbonate and bicarbonate occur or are produced. More in particular, as will become evident from the further discussion, the various crystal forms of sodium carbonate are important starting materials. Also the various double salts of sodium carbonate and sodium bicarbonate, optionally containing crystal water, such as trona may be used.

The various embodiments of the invention are all based on solution mediated recrystallisation or conversion, contrary to the evaporative crystallisation that is conventionally used for commercial soda production, and where the evaporation of water from the process is essential to cause crystallisation. The process of the invention accordingly has the distinct advantage of avoiding the evaporation step and thus of much lower energy requirements, thereby reducing the production costs. Further the invention allows it to produce soda of much higher bulk density, up to 50% higher, thereby reducing storage and transport costs.

The invention is based on influencing the water activity of the system, by adding organic solvents, as defined herein, whereby the transition temperature above which the anhydrate is stable and below which the monohydrate is stable, is decreased. In this system it is not relevant if the addition of the solvent increases or decreases the solubility of the soda.

A further aspect of influencing the water activity of the system resides in an improvement of the possibilities of steering the process performance. With a decreased transition temperature it is possible to determine the optimal operating temperature range. An important aspect is of course that the transition temperature is below the boiling temperature of the system at the pressure applied. At the transition temperature there will be no driving force for recrystallisation or conversion, as is clear from a schematic solubility diagram that can be plotted in the following manner.

The solubilities of sodium carbonate monohydrate (MH) and anhydrous soda (AH) can be plotted versus the temperature, at a constant solvent/water ratio and pressure.

At a certain temperature, the so-called transition temperature, the solubilities are equal.

At temperatures above the transition temperature the more stable AH has the lower solubility, while the less stable MH has a higher solubility. A solution which is saturated with MH, is supersaturated with respect to AH. Therefore, if these two solid phases are simultaneously present, AH crystals will grow. This leads to an undersaturation with respect to MH, which will dissolve. The rates of MH dissolution and of AH growth will become balanced at a certain soda concentration which lies between the two solubilities at that temperature. Since the maximum supersaturation of AH growth is limited by the solubility difference of AH and MH, and since this difference can be controlled via the temperature (at a given solvent concentration), the crystallization is well controlled. This is important for obtaining the desired high purity and bulk density (via the crystal size distribution).

At temperatures below the transition temperature the recrystallization takes place in the opposite direction: AH→MH.

By changing the temperature the difference in solubility can be regulated; the further the temperature is above the transition temperature, the higher the recrystallisation rate. By careful selection of the operating temperature, it is thus possible to regulate the rate of recrystallisation, whereby lower rates yield improved product purity, crystal quality and bulk density. On the other hand higher temperatures result in increased recrystallisation rates, thereby decreasing processing time and equipment costs, but at the cost of product properties.

An important aspect in the process of the invention is that the degree of supersaturation will never be high throughout the system, contrary to the evaporative crystallisation processes, where locally the supersaturation may become high. As a consequence there is much less chance of impurities being included in the crystals and of uncontrolled seed formation rate.

In the evaporative crystallisation processes it is only possible to regulate the amount of water being removed. In the process of the invention it is possible to control the maximum degree of supersaturation in a much better way by careful selection of the process conditions, resulting in purer product, better crystals and crystal size distribution.

In this respect it is to be noted, that this process, when used instead of the heat densification process, results in additional purification.

Even when the process conditions are selected in such a way, that the rate of crystallisation is low, it is possible by careful selection of process equipment, like number of crystallisers, classifiers (hydrocyclones), recirculation systems, to increase the total production rate again, thereby compensating for the loss in production rate in the actual crystallisation.

It is also within the scope of the present invention to repeat the solution mediated conversion of monohydrate into anhydrate to improve the purity and bulk density of the soda. This would imply intermediate anhydrate monohydrate solution mediated conversions.

In summary this means, that the use of the process of the invention results in a decrease of energy requirements, while maintaining the same product quality, or even improving it.

PREFERRED EMBODIMENTS OF THE INVENTION

Starting from the general embodiment of the process according to the invention there are various options for carrying out this process.

One important embodiment of this process is based thereon that so-called light soda ash can be recrystallised or converted in a suspension, to give dense soda, having a much higher bulk density. In accordance with this embodiment light soda is slurried in a mixture of water and solvent, at a temperature below the transition temperature. Thereby the sodium carbonate anhydrate crystals are converted to monhydrate crystals by a solution mediated process. Subsequently the temperature of the resulting slurry of sodium carbonate monohydrate is increased to above the said transition temperature. The monohydrate crystals are converted to anhydrate crystals, as that has become the stable form, again by a solution mediated recrystallisation. During this conversion the anhydrate has a higher bulk density than before.

This embodiment can be used as treatment after the conventional soda process, instead of the heat densification step. An important advantage of this embodiment of the invention, compared to the heat densification step, is that no water need to be evaporated. In the heat densification step water is required, which has to be removed subsequently. In the process of the invention this is not the case.

Another area where the process of the present invention is important concerns the mining and refining of Trona. Trona is a raw material, mainly mined in the United States and in Africa, and consists of deposits of double salts of sodium carbonate and sodium bicarbonate in a molar ratio of roughly 1:1 and containing varying amounts of impurities, generally insolubles, varying from deposit location to deposit location.

For the purpose of the present invention the use of trona for producing soda is the only relevant one, although trona is also used for producing other materials. In the present case there exist already a number of ways to convert trona into sodium carbonate monohydrate. All methods are based on the principle that the sodium bicarbonate, through heating, is converted into sodium carbonate, thereby producing carbon dioxide and water. This conversion is generally carried out at increased temperature, the so-called wet-calcining temperature.

The present invention now provides an improved method for producing soda from trona (or another sodium bicarbonate source, such as the Solvay process).

According to one embodiment trona is calcined to yield a sodium carbonate, using known techniques. This carbonate is hydrated at a temperature below the transition temperature and subsequently converted to the anhydrate, as disclosed earlier, by recrystallisation.

In general it is to be remarked that the process of the invention has advantages in that it produces soda of increased bulk density, while requiring less energy. Accordingly the process may be applicable and advantageous, as soon as there is a need for producing anhydrous soda of bulk density comparable to or higher than that produced in accordance with the conventional processes. The advantages are generally the most pronounced when the soda produced has a bulk density of more than 1000 kg/m$^3$, more in particular more than 1300 kg/m$^3$.

The process of the invention is preferably carried out at ambient pressure, i.e. at atmospheric pressure, as this requires the least investments. However, a small over- or under-pressure may also be applied, as this does not require large investments and may result in operational advantages. Accordingly it is generally possible to use a pressure from 0.5 bar (abs) or higher. Under certain circumstances it may even be advantageous to use pressures up to 5 bar for the crystallization step itself.

The temperature of the recrystallisation step is a critical parameter, which is determined in relation to the required purity and the composition of the liquid system, i.e. water and one or more solvents. Of course the temperature should be below the boiling temperature of the system. This boiling point is determined by the amount and the nature of the solvent(s). Generally, the recrystallisation is done at a temperature sufficiently far below the boiling point that no substantial evaporation of the water and/or solvent occurs. Suitable temperatures for the recrystallisation are between 15 and 105° C., more in particular between 45 and 95° C. In case at least part of the recrystallisation step is combined with a calcination or decomposition of bicarbonate to carbonate, it should be taken into account, that the temperature is sufficiently high for the decomposition reaction to proceed at a sufficiently high rate. In that situation temperatures of at least 80° C. are preferred, possibly combined with a slightly decreased pressure. The calcination step is included in the process in order to produce soda from the bicarbonate. Of course it is not necessary to include this step in case traces of sodium bicarbonate (resulting from incomplete calcination) are present in the product.

Another important parameter in the invention is the choice of type and amount of solvent. Contrary to the situation in the evaporative crystallisation, the solvent does not play a relevant role in influencing the boiling point (i.e. the solvent is not selected for its influence on the boiling point), but should decrease the transition temperature of the monohydrate-anhydrate transition, as defined herein. In order to get a sufficiently large decrease it is generally preferred to have an amount of solvent which is at least 5 wt % of the liquid phase, i.e. 5% of the combined weight of water and solvent.

The amount of solvent is also dependent on the nature thereof. A solvent having a large influence on the water activity may be used in smaller amounts than a solvent that has a smaller influence. In general it is, however, preferred to have an amount of solvent of at least 20 wt. %, whereby the upper limit is generally determined by its influence on the solubility of the soda (which is generally negative). It is of course important that the soda has a sufficiently high solubility product to be able to carry out the solution mediated recrystallisation. For this purpose the solubility may, however, be much lower than is necessary for the evaporative crystallisation. Generally, the upper limit of the amount of solvent will be 90 wt. %.

As indicated already, the nature of the solvent plays an important role in the process of the invention. In the first place it should be stable under the process conditions and it should not interfere with the stability and quality of the soda. Preferably it should also be of such nature that minute amounts left in the soda are not detrimental to the future use of the soda. Finally, it would be advantageous if the adhering solvent could be removed from the soda, after separation of the soda from the mother liquor, in an easy manner, for example by washing or evaporation.

Taking all the aspects into account, some of which are more important than others depending on the use of the soda, one can define a number of groups of organic solvents.

As a most general definition the solvents can be defined as those water miscible or partly water miscible organic compounds that influence the water activity of the system. This tends to exclude the pure hydrocarbons, as their influence is limited and further they are not really sufficiently water miscible. However, all substituted hydrocarbons and all hydrocarbons containing one or more hetero atoms may be tested for their suitability.

Preferred compounds are the various hydroxy group containing compounds, ether group containing compounds, amine group containing compounds, aldehyde group containing compounds, keto group containing compounds, carboxy group containing compounds and the like.

More preferred are the mono- and polyhydroxy compounds such as the monoalcohols, including the lower alcohols having 1 to 6 carbons atoms (methanol, ethanol, propanol, butanol, pentanol and hexanol, which may have straight or branched alkyl chains), polyols, such as glycols, glycerol and the like are deemed suitable. Most preferred are the low molecular weight polyols, such ethylene glycol, diethylene glycol, glycerol, 1,2-propane diol, 1,3-propane diol, the butane diols, polyethylene glycol, polypropylene glycol, polyethylene-propylene glycol (those glycols having a molecular weight between about 150 and 600) and the like.

Amines may be used, provided that they do not react with the carbonate group. An other group of potentially suitable compounds are the amides and nitrites. Ethers, ketones and aldehydes may also be used, whereby especially suitable compounds are acetone and methyl-ethyl ketone.

The various reactions can be carried out in equipment that is conventional for this process. No specific design is necessary, beyond the standard and routine amendments generally necessary, taking into account the process conditions. As soda production is generally carried out continuously, it is preferred to use two or more reactors for each recrystallisation or conversion step.

DETAILED DESCRIPTION OF THE INVENTION

In the prior art, the monohydrate process is the most widely applied method to produce soda ash from trona ($Na_2CO_3 \cdot NaHCO_3 \cdot 2H_2O$). This process is now described. A number of unit operations is deployed to convert the feed into the light soda ash. First the trona is calcined. When water and carbon dioxide are removed, a porous raw soda produce is left with, typically, 10 w % of impurities (silicates mainly). To remove this non-soluble impurities, water is added to selectively dissolve the soda. The impurities are then removed by means of filtration and a clear brine stream is then fed to the evaporative crystalliser. Usually a cascade of three evaporative crystallisers is used to produce the monohydrous soda form which is stable at the operating conditions. After the monohydrate is removed from the slurry, it is calcined into light soda ash with a density of about 800 kg/m$^3$. A final step in the product process usually is the bulk densification of the soda ash. A heat densification treatment in a third calciner increases the bulk density up to 1000 kg/m$^3$.

Light soda produced according to the solvay process also has a low bulk density (of about 550 kg/m$^3$) due to the fact that in the final step of the process sodium bicarbonate is calcined. Upon the evaporation of water and carbon dioxide a very porous product results that is also subjected to the thermal treatment to increase the bulk density.

Light soda from both the monohydrate and the Solvay process can be used in an embodiment of the invention. The anhydrous light soda is added to a series of crystallisers 1 that are operated at such conditions that monohydrous soda is stable. The anhydrate will therefor transform into monohydrate. The transition from monohydrate into anhydrate (and vice versa) is a solution mediated transition in which the unstable hydrate will dissolve, resulting in a supersaturation for the stable phase which then crystallises. Since the rate of recrystallisation in a certain mixture is depending on the temperature only, the supersaturation may be kept at a desired, low value which results in a pure product of large crystals.

The soda monohydrate is transferred to a second series of crystallisers that are operated at a temperature above the transition point of the applied mixture. Under these circumstances monohydrate will transform into anhydrate again. After filtration (or another wet classification), the mother liquor is used to heat the monohydrate slurry and then recycled into the first series is of crystallisers.

Instead of using light soda ash, it is also possible to apply calcined trona as a feed stream. One major disadvantage is, however, the presence of impurities in the calcined trona. Therefor, one adjustment is made to the flow scheme. After the first series of crystallisers, a cyclone (or another wet classifier) is added to separate the fine impurities from the large monohydrage cyrstals.

Another option is the solution mediated recrystallisation of the monohydrate that leaves the crystallisers in the monohydrate process. Instead of calcining, the monohydrate is added to a mixture of water and (anti) solvent. Due to the temperature and mother liquor composition, the transition temperature is lower than the actual crystalliser temperature and anhydrate will be formed. Notice that when monohydrate is added and anhydrate is the product, water has to be removed somewhere in the process. It is possible to treat a small part of the clear liquor mother by means of distillation. In case a high boiling solvent is applied, water will be the top product, while sod and (maybe) some of the impurities will be precipitated in the bottom product flow. In case a solvent is used having a lower boiling point than water, the solvent will be the topproduct.

Another option is the solution mediated conversion of trona: raw trona (with impurities) is added to the crystalliser together with concentrated solvent. The conversion is carried out at a temperature below the conversion is carried out at a temperature below the mixture's boiling point. Due to the high temperature, the trona will decompose. Anhydrous soda, carbon dioxide and water are formed. The carbon dioxide leaves the crystalliser due to the solvent's waterbinding behaviour. The calcination step is carried out below the mixture's boiling point. Then, the soda is separated from the impurities in a series of settling tanks or other wet classifiers. By cooling down the mixture in the second series of crystallisers, monohydrate is formed when the temperature is below the transition temperature (if necessary water can to be added). Subsequent heating in the third series of crystallisers will produce anhydrate again. When the supersaturation is kept low (i.e. a temperature just above transition point of the mixture) the size of the anhydrous particles will be large. Finally, the product is separated from the slurry and the clear mother liquor is treated in e.g. a distilling column: water is purged or recycled within the flow sheet, the high-boiling solvent is returned to the first crystalliser.

A comparable flowsheet is proposed for the wet calcination of sodium bicarbonate. The only difference is that due to the high purity of the feed, no settling tanks and filters are needed to remove insoluble impurities.

The invention is now elucidated on the basis of an example, which is not intended as limiting the invention.

EXAMPLE 8.1 g/min light soda ash from the Solvay process, having a bulk density of about 550 kg/m$^3$, and 72.6 g/min of brine (29.6 wt. % of water, 65.4 wt. % of ethylene glycol and 5 wt. % of sodium carbonate) were fed continuously to an 1.71 crystalliser, which was kept at a temperature of 40° C. Thereby the soda was hydrated via a solution mediated conversion to monohydrate. The residence time in this first crystalliser was 30 min.

The slurry of monohydrate crystals was transferred continuously to a second crystalliser, wherein the residence time was also 30 min. This crystalliser was operated at 80° C., well above the transition temperature of about 70° C. in this system.

In this second crystalliser a solution mediated recrystallisation took place of the monohydrate into the anhydrate, which was continuously recovered in an amount of 8.1 g/min. After 4 hours of continuous operation, the bulk density of the product was 1350 kg/m$^3$.

What is claimed is:

1. A process for the production of sodium carbonate anhydrate having a bulk density of at least 800 kg/m$^3$, said process comprising:

providing a suspension of solid sodium carbonate and/or solid sodium bicarbonate and/or solid double salts at least comprising one of sodium carbonate and sodium bicarbonate, in a mixture containing water and an at least partly water miscible organic solvent, which solvent influences the transition temperature below which sodium carbonate monohydrate is stable, whereby said solvent and the amount of said solvent are selected such that the said transition temperature is below the boiling point of the said mixture of water and said at least partly water miscible organic solvent and wherein said solvent comprises at least about 5 wt. % of the combined weight of the water and solvent, wherein if sodium bicarbonate is present, converting the sodium bicarbonate into sodium carbonate at a temperature above said transition temperature and below the boiling point, whereby the sodium bicarbonate decomposes into sodium carbonate, carbon dioxide and water, providing a suspension temperature in the suspension that is below the transition temperature for a time period effective to convert the sodium carbonate to crystals of sodium carbonate monohydrate, increasing the temperature to and maintaining the temperature of the suspension at a temperature above the said transition temperature and below the said boiling point in order to recrystallize the sodium carbonate monohydrate crystals into crystals of sodium carbonate anhydrate from said mixture, and recovering the sodium carbonate anhydrate.

2. Process according to claim 1, wherein sodium carbonate anhydrate crystals, having a bulk density of less than 1100 kg/m$^3$ are hydrated in a mixture of water and solvent at a temperature below the said transition temperature, following which the temperature of the resulting slurry of sodium carbonate monohydrate is increased to above the said transition temperature.

3. Process according to claim 1, wherein trona is dissolved in said mixture of water and said solvent, optionally filtered and calcined, following which sodium carbonate monohydrate is crystallised from the resulting solution of sodium carbonate, and the sodium carbonate monohydrate is recrystallised at a temperature above the said transition temperature.

4. Process according to claim 1, wherein the crystallisation of sodium carbonate anhydrate takes place at a pressure of more than about 0.5 bar.

5. Process according to claim 1, wherein the sodium carbonate anhydrate obtained from the said crystallisation is converted to monohydrate and crystallised again at a temperature above the said transition temperature.

6. A process according to claim 1, wherein the said organic, water miscible or partly water miscible solvent solvent comprises a hydroxy group containing organic compound, an ether group containing organic compound, an amine group containing organic compound, an aldehyde group containing organic compound, a ketone group containing organic compound, or a carboxy group containing organic compound.

7. A process according to claim 6, wherein said hydroxy group containing organic compounds comprise alcohols.

8. A process according to claim 7, wherein said alcohols are selected from the group consisting of monoalcohols and polyols.

9. A process according to claim 8, wherein said alcohols are selected from the group consisting of methanol, ethanol, propanol, butanol, pentanol, hexanol, glycols and glycerol.

10. A process according to claim 1, wherein said at least partly water miscible solvent comprises acetone and/or methyl-ethyl ketone.

11. A process according to claim 1, wherein said organic, water miscible at least partly water miscible solvent comprises ethylene glycol.

12. A process for producing sodium carbonate having a bulk density of at least about 800 kg/m$^3$ which comprises:

preparing a slurry comprised of light soda ash comprising sodium carbonate anhydrate crystals, and a mixture containing water and an at least partly water miscible organic solvent, wherein (i) said solvent comprises from 5 wt. % to 90 wt. % of the combined weight of water and said solvent, (ii) the solvent and amount of said solvent selected are such that the slurry has a transition temperature below which sodium carbonate monohydrate is stable, and which is below the boiling point of the mixture of said solvent and the water, and filter wherein the preparing of the slurry includes providing a slurry temperature in die slurry that is below the transition temperature for a time period effective to convert the sodium carbonate anhydrate crystals to sodium carbonate monohydrate crystals; and increasing the temperature to and maintaining the temperature of the slurry at a temperature above the transition temperature and below the boiling point in order to recrystallize the sodium carbonate monohydrate crystals into crystals of sodium carbonate anhydrate from said slurry.

* * * * *